(12) United States Patent
Briand et al.

(10) Patent No.: US 10,399,691 B2
(45) Date of Patent: Sep. 3, 2019

(54) FLEXIBLE FUEL TANK HAVING ELECTROSTATIC CHARGE DISSIPATING PROPERTIES

(71) Applicant: ZODIAC AEROSAFETY SYSTEMS, Plaisir (FR)

(72) Inventors: Valerie Briand, Saint-Ouen-du-Tilleul (FR); Sara Filippidis, Saint Etienne du Rouvray (FR); Stephanie Lacointe, Criqueboeuf sur Seine (FR); Sebastien Vernay, Rouen (FR)

(73) Assignee: ZODIAC AEROSAFETY SYSTEMS (FR)

( * ) Notice: Subject to any disclaimer, the term of this patent is extended or adjusted under 35 U.S.C. 154(b) by 0 days.

(21) Appl. No.: 15/585,447

(22) Filed: May 3, 2017

(65) Prior Publication Data
US 2017/0320588 A1 Nov. 9, 2017

(30) Foreign Application Priority Data
May 3, 2016 (FR) ...................................... 16 54012

(51) Int. Cl.
*B64D 37/06* (2006.01)
*B32B 7/12* (2006.01)
(Continued)

(52) U.S. Cl.
CPC .............. *B64D 37/06* (2013.01); *B29C 49/04* (2013.01); *B29C 65/02* (2013.01); *B29C 65/48* (2013.01);
(Continued)

(58) Field of Classification Search
CPC ........ B64D 37/06; B64D 37/32; B29C 49/04; B29C 65/48; B29C 65/02; B32B 27/304;
(Continued)

(56) References Cited

U.S. PATENT DOCUMENTS 1,984,261 A * 12/1934 Foy ........................ F25D 23/062
220/592.26
2,485,647 A * 10/1949 Norquist ............ B65D 81/3823
217/128

(Continued)

FOREIGN PATENT DOCUMENTS

| FR | 2 707 916 | 1/1995 |
| FR | 2 957 296 | 9/2011 |
| WO | 2014/117772 | 8/2014 |

OTHER PUBLICATIONS

French Search Report dated Jan. 30, 2017.

*Primary Examiner* — Kareen K Thomas
(74) *Attorney, Agent, or Firm* — Gerald E. Hespos; Michael J. Porco; Matthew T. Hespos

(57) ABSTRACT

A flexible fuel tank (10) has, from the inside to the outside of the tank: a single-layer or multilayer liner (2) having properties of sealing with respect to the liquid, impermeability to the vapor of said fuel, and dissipation of electrostatic charges. The liner (2) includes an inner face (2a) intended to be in contact with the fuel and an outer face (2b). An intermediate layer (3) is in contact with the outer face (2b) of the liner (2), for example a coating layer; and a textile reinforcing layer (4) is in contact with the intermediate layer (3).

19 Claims, 1 Drawing Sheet

(51) Int. Cl.
  *B32B 25/10*  (2006.01)
  *B32B 25/16*  (2006.01)
  *B32B 25/20*  (2006.01)
  *B32B 27/12*  (2006.01)
  *B32B 27/18*  (2006.01)
  *B32B 27/20*  (2006.01)
  *B32B 27/28*  (2006.01)
  *B32B 27/30*  (2006.01)
  *B32B 27/34*  (2006.01)
  *B32B 27/40*  (2006.01)
  *B32B 1/02*  (2006.01)
  *B29C 49/04*  (2006.01)
  *B29C 65/02*  (2006.01)
  *B29C 65/48*  (2006.01)
  *B64D 37/32*  (2006.01)
  *B29L 31/00*  (2006.01)

(52) U.S. Cl.
  CPC .................. *B32B 1/02* (2013.01); *B32B 7/12* (2013.01); *B32B 25/10* (2013.01); *B32B 25/16* (2013.01); *B32B 25/20* (2013.01); *B32B 27/12* (2013.01); *B32B 27/18* (2013.01); *B32B 27/20* (2013.01); *B32B 27/281* (2013.01); *B32B 27/285* (2013.01); *B32B 27/286* (2013.01); *B32B 27/288* (2013.01); *B32B 27/304* (2013.01); *B32B 27/306* (2013.01); *B32B 27/34* (2013.01); *B32B 27/40* (2013.01); *B64D 37/32* (2013.01); *B29L 2031/7172* (2013.01); *B32B 2264/105* (2013.01); *B32B 2264/108* (2013.01); *B32B 2307/302* (2013.01); *B32B 2307/7242* (2013.01); *B32B 2307/7265* (2013.01); *B32B 2605/12* (2013.01); *B32B 2605/18* (2013.01); *Y02T 90/44* (2013.01)

(58) Field of Classification Search
  CPC ......... B32B 27/40; B32B 25/10; B32B 25/16; B32B 25/20; B32B 27/12; B32B 27/18; B32B 27/20; B32B 1/02; B32B 7/12; B32B 27/288; B32B 27/286; B32B 27/285; B32B 2605/18; B32B 2264/105; B32B 2264/108; B32B 2307/302; B32B 2307/7242; B32B 2307/7265; B32B 2605/12; B29L 2031/7172
  USPC .................. 220/562, 586, 592.2–592.26
  See application file for complete search history.

(56) References Cited

U.S. PATENT DOCUMENTS

| | | | | |
|---|---|---|---|---|
| 2,777,295 | A * | 1/1957 | Bliss | F17C 3/022 114/74 A |
| 4,519,415 | A * | 5/1985 | Carn | F17C 3/022 137/318 |
| 5,251,473 | A * | 10/1993 | Reese | B60S 5/02 137/264 |
| 5,560,150 | A * | 10/1996 | Pearson | E04H 5/04 52/143 |
| 5,601,204 | A * | 2/1997 | Hall | B65D 90/028 220/560.03 |
| 6,257,437 | B1 * | 7/2001 | Slater | B65D 90/028 220/567 |
| 6,286,707 | B1 * | 9/2001 | Hall | B65D 90/028 220/565 |
| 2007/0026177 | A1 | 2/2007 | Kitahara et al. | |
| 2015/0274311 | A1 | 10/2015 | Briand | |

* cited by examiner

FLEXIBLE FUEL TANK HAVING ELECTROSTATIC CHARGE DISSIPATING PROPERTIES

BACKGROUND

1. Field of the Invention

The present invention relates to a flexible fuel tank.

2. Description of the Related Art

Typically, flexible fuel tanks for aircraft generally comprise a barrier layer having fuel impermeability properties. This barrier layer makes it possible to obtain an impermeability in line with aeronautic requirements for this type of application, in particular standard ETSO-C80, which consists of a permeability to fuel vapors lower than 6 g/m$^2$/24 h.

During pressurized filling of these tanks, the friction of the fuel in the inner surface of the tank (in particular for helicopters) may generate electrostatic charges. Yet this potential accumulation of electrostatic charges represents a safety risk. Indeed, electrostatic discharges may cause an explosion due to ignition of the gaseous fuel, which can have dramatic consequences.

Consequently, the flexible fuel tanks of the prior art are not optimized, in particular since they are potentially unsafe.

One aim of the present invention is therefore to resolve the aforementioned problems by proposing a safe, lighter and easy-to-produce solution.

SUMMARY

Thus, the present invention relates to a flexible fuel tank comprising, from the inside to the outside of said tank:
- a single-layer or multilayer liner having properties of sealing with respect to the liquid, impermeability to the vapor of said fuel, and dissipation of electrostatic charges, said liner including an inner face intended to be in contact with the fuel and an outer face;
- an intermediate layer in contact with the outer face of the liner, for example a coating layer; and
- a textile reinforcing layer in contact with the intermediate layer.

According to preferred embodiments, the tank according to the present invention comprises at least one of the following features:
- the liner has, preferably at its outer face, an impermeability with respect to the fuel vapors below 6 g/m$^2$/24 h,
- the inner face of the liner has a surface resistivity lower than 10$^8$ ohm/square,
- the liner comprises at least a first outer layer having said properties of sealing with respect to the liquid and impermeability to the fuel vapor and having, as main component in its matrix, at least one polymer chosen from among polyamides such as Pa 6, Pa 6.6, Pa 11, Pa 12, Pa 6.12, Pa 4.6, co-polyamides, aromatic polyamides, polyimides, polyphenol sulfites, fluorinated polymers such as PVF, PVDF, ETFE or PFA, polyether ketones such as PEEK or PEKK, or EVOH, and the second inner layer having the properties of dissipating electrostatic charges and having, as primary component in its matrix, at least one polymer chosen from among polyamides such as Pa 6, Pa 6.6, Pa 11, Pa 12, Pa 6.12, Pa 4.6, co-polyamides, aromatic polyamides, polyimides, polyphenol sulfides, fluorinated polymers such as PVF, PVDF, ETFE, FEP or PFA, polyether ketones such as PEEK or PEKK, EVOH, polyurethane, nitrile and its derivatives such as hydrogenated nitrile or nitrile/PVC, epichlorhydrin and its derivatives, fluoropolymer and its derivatives, polychloroprene or fluorosilicone,
- the liner contains conducting fillers such as standard reinforcing carbon black, conducting carbon black, single-, double- or multi-walled carbon nanotubes, graphite, intrinsic conducting polymers or metal fillers, or a mixture of at least some of these fillers,
- the conducting fillers are integrated within the matrix of the liner by mixing in a single or twin screw extruder, by mixing through a liquid avenue or by mixing of the rubber on two-cylinder mixer type or in an internal mixer,
- the liner includes conducting fillers at rates from 0.5 to 100 parts per 100 parts polymer,
- the liner includes fillers of the carbon nanotube type in a quantity lower than 10 parts per 100 parts polymer, preferably less than 7 parts per 100 parts polymer, and more advantageously smaller than 5 parts per 100 parts polymer,
- the liner includes fillers of the carbon black type, the specific surface of which per BET according to standard ASTM D3037 is comprised between 12 and 2000 m$^2$/g,
- the quantity of conducting fillers in the liner is sufficient to ensure the presence of an internal percolation network,
- the liner has a total thickness smaller than 150 microns,
- the liner is manufactured by a film extrusion or extrusion blow molding or bi-extrusion or multi-extrusion,
- the liner is manufactured by aqueous coating or solvent on an anti-adhesive substrate,
- the liner is manufactured using a typical application method for polymer paints in an aqueous or solvent route, such as spraying, application by brush or roller,
- the reinforcing textile layer includes several thicknesses of textile reinforcements, and
- the bonding of the liner to the textile reinforcement is provided by hot gluing, cold gluing, co-vulcanization or welding.

Furthermore, the present invention relates to a method for producing a flexible fuel tank as described above, characterized in that it consists of:
- positioning, on the outer wall of a mold in the shape of the tank to be manufactured, a liner having properties of sealing against the liquid, impermeability to the vapor of said fuel, dissipation of electrostatic charges, said liner including an inner face intended to be in contact with the fuel,
- assembling a reinforcing textile on the liner using an intermediate layer, for example a coating layer.

According to another embodiment, the present invention relates to a method for producing a flexible fuel tank as previously described, characterized in that it consists of:
- positioning a reinforcing textile on the inner wall of a mold in the shape of the tank to be manufactured,
- assembling on the reinforcing textile, using an intermediate layer, for example a coating layer, a liner having properties of sealing against the liquid, impermeability to the vapor of said fuel, dissipation of the electrostatic charges, said liner including an inner face intended to be in contact with the fuel.

The invention will now be described in more detail in reference to specific embodiments given by way of illustration only and shown in the appended figures.

DETAILED DESCRIPTION

Figure 1:
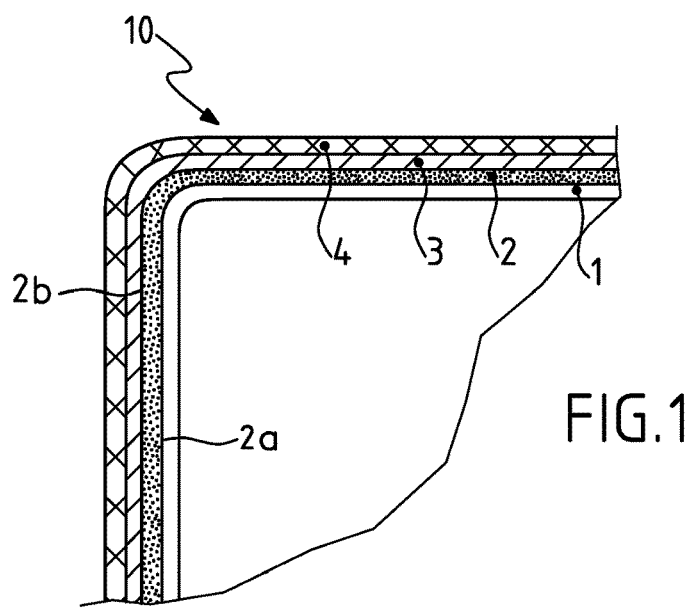
FIG. 1 is a sectional view of a first embodiment of the tank according to the present invention.

FIG. 1 shows a mold 1 intended to produce a tank 10 according to the present invention.

In this first embodiment, the tank 10 is made as follows. A liner 2, having properties of sealing against the liquid, impermeability to the vapor of said fuel and dissipation of the electrostatic charges, is positioned on the outer wall 1b of the mold 1 having the shape of the tank to be manufactured. A reinforcing textile 4 is next assembled to the liner 2 using an intermediate layer 3, for example a coating layer of the textile reinforcement.

Figure 2:
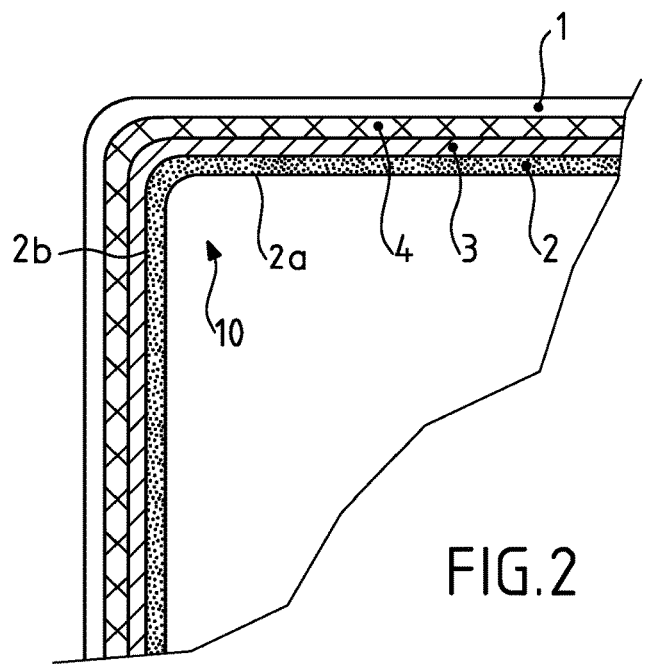
FIG. 2 is a sectional view of a second embodiment of a tank according to the present invention.

In the second embodiment illustrated by FIG. 2, a reinforcing textile 4 is positioned on the inner wall 1a of a mold 1 in the shape of the tank to be manufactured, then a liner 2 having properties of sealing against the liquid, impermeability to the vapor of said fuel, and dissipation of the electrostatic charges is assembled on the reinforcing textile 4 using an intermediate layer 3, for example a coating layer of the textile.

The assembly between the liner 2 and the intermediate layer may be of the hot or cold gluing, co-vulcanization or welding type.

The textile reinforcing layer 4 includes several thicknesses of textile reinforcements.

Once produced and stripped, the liner 2 of the tank 10 includes an inner face 2a intended to be in contact with the fuel.

The liner 2 has a total thickness smaller than 150 microns, which makes it possible to obtain a tank with a reduced mass.

It can be produced by film extrusion or extrusion blow molding or bi-extrusion or multi-extrusion, or by aqueous or solvent coating on an anti-adhesive substrate, or by a typical method for applying polymer paints through aqueous or solvent avenues, such as spraying, application by brush or by roller.

Advantageously, at its outer face 2b, the liner 2 has an impermeability with respect to the fuel vapors lower than 6 g/m$^2$/24 h.

Likewise, the inner face 2a of the liner 2 has a surface resistivity lower than 108 ohm/square.

Figure 3:
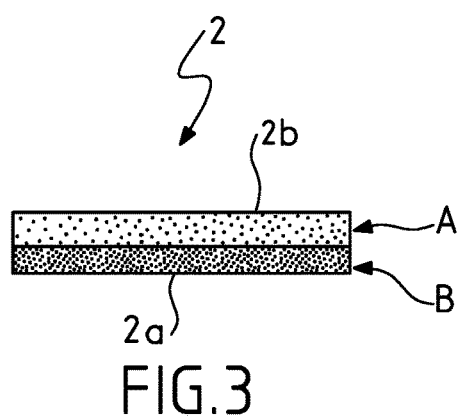
FIG. 3 is a sectional detailed view of part of the tank of FIG. 1, namely a liner.

As shown in FIG. 3, the liner 2 can include two layers A and B, but it may also include only one layer or more than two layers, in particular an additional layer to provide the bond between layers A and B, or to provide the bond between layer A and the intermediate layer 3.

In the embodiment including two layers, the first outer layer A having properties of sealing against the liquid and impermeability to the fuel vapor has, as main component in its matrix, at least one polymer chosen from among polyamines such as Pa 6, Pa 6.6, Pa 11, Pa 12, Pa 6.12, Pa 4.6, co-polyamides, aromatic polyamides, polyimides, polyphenol sulfides, fluorinated polymers such as PVF, PVDF, ETFE or PFA, polyether ketones such as PEEK or PEKK, or EVOH, while the second inner layer B (the layer in contact with the fuel) having properties of dissipating electrostatic charges has, as main component in its matrix, at least one polymer chosen from among polyamines such as Pa 6, Pa 6.6, Pa 11, Pa 12, Pa 6.12, Pa 4.6, co-polyamides, aromatic polyamides, polyimides, polyphenol sulfides, fluorinated polymers such as PVF, PVDF, ETFE, FEP or PFA, polyether ketones such as PEEK or PEKK, EVOH, polyurethane, nitrile and its derivatives such as hydrogenated nitrile or nitrile/PVC, epichlorhydrin and its derivatives, fluoropolymer and its derivatives, polychloroprene or fluorosilicone.

In order to contribute the property of dissipating electrostatic charges, the liner 2 contains conducting fillers such as standard reinforcing carbon black, conducting carbon black, single-, double- or multi-walled carbon nanotubes, graphite, intrinsic conducting polymers or metal fillers, or a mixture of at least some of these fillers.

Advantageously, the quantity of conducting fillers in the liner 2 is sufficient to ensure the presence of an inner percolation network.

These conducting fillers are integrated within the matrix of the liner 2 by mixing in a single or twin screw extruder, by mixing through a liquid avenue, the matrix being dissolved in a solvent, or an aqueous avenue, or by mixing of the rubber type for elastomer matrices on a bi-cylinder mixer or in an internal mixer. The mixing method for these fillers within the matrix will affect their distribution (homogeneity of concentration, dispersion) and their orientation. It will therefore also influence the proportion of fillers to be introduced to obtain a percolation.

The liner 2 includes conducting fillers at rates of 0.5 to 100 parts per 100 parts polymer.

In the case where the conducting fillers are of the carbon nanotube type, the latter are present in a quantity lower than 10 parts per 100 parts polymer, preferably lower than 7 parts per 100 parts polymer, and more advantageously lower than 5 parts per 100 parts polymer.

Adding an excessive quantity of conducting fillers within the matrix may lead to a weakening of the barrier properties that is incompatible with the invention in the case of a single-layer liner.

The fillers of the intrinsic conductor polymer type (polyaniline, for example) allow little or no deterioration of the barrier properties.

Using lamellar conducting fillers of the graphite type, which may or may not be associated with the other types of fillers, may prove particularly useful to retain good barrier properties. The lamellar fillers create a more twisting conveyance circuit for the fuel within the matrix that may counterbalance the weakening of the barrier properties.

If the conducting fillers are of the carbon black type, their specific surface per BET according to standard ASTM D3037 is comprised between 12 and 2000 m$^2$/g.

Of course, the detailed description of the subject matter of the Invention, provided solely as an illustration, in no way constitutes a limitation, technical equivalents also being comprised in the scope of the present invention.

What is claimed is:

1. A flexible fuel tank comprising:
    a liner including a first outer layer having properties of sealing with respect to a fuel and impermeability to a fuel vapor, the first outer layer formed from at least one polymer from a group of polyamides including Pa 6, Pa 6.6, Pa 11, Pa 12, Pa 6.12, Pa 4.6, co-polyamides, aromatic polyamides, polyimides, polyphenol sulfites, fluorinated polymers, polyether ketones, and a second inner layer having properties of dissipating electrostatic charges, and formed from at least one polymer from a group of polyamides including Pa 6, Pa 6.6, Pa 11, Pa 12, Pa 6.12, Pa 4.6, co-polyamides, aromatic polyamides, polyimides, polyphenol sulfides, fluorinated polymers, polyether ketones polyurethane, nitrile and its derivatives, epichlorhydrin and its derivatives, fluoropolymer and its derivatives, polychloroprene or fluorosilicone, wherein the liner has an inner face in contact with the fuel and having a surface resistivity lower than $10^8$ ohm/square, and an outer face opposite the inner face, the outer face having an impermeability to vapors from the fuel below 6 g/m$^2$/24 h;

an intermediate layer in contact with the outer face of the liner; and a textile reinforcing layer in contact with the intermediate layer and bonded to the liner by hot gluing, cold gluing, co-vulcanization, or welding.

2. The tank of claim 1, wherein the liner includes fillers of the carbon nanotube type in a quantity lower than 10 parts per 100 parts polymer.

3. The tank of claim 1, wherein the liner contains conducting fillers selected from a group including standard reinforcing carbon black, conducting carbon black, single-, double- or multi-walled carbon nanotubes, graphite, intrinsic conducting polymers or metal fillers, or a mixture of at least some of these fillers.

4. The tank of claim 3, wherein the conducting fillers are integrated within the matrix of the liner by mixing in a single or twin screw extruder, by mixing through a liquid avenue or by mixing of the rubber on two-cylinder mixer type or in an internal mixer.

5. The tank of claim 3, wherein the liner includes conducting fillers at rates from 0.5 to 100 parts per 100 parts polymer.

6. The tank of claim 3, wherein the liner (2) includes fillers of the carbon black type, the specific surface of which per BET according to standard ASTM D3037 is comprised between 12 and 2000 m$^2$/g.

7. The tank of claim 3, wherein the quantity of conducting fillers in the liner is sufficient to ensure the presence of an internal percolation network.

8. The tank of claim 1, wherein the liner has a total thickness smaller than 150 microns.

9. The tank of claim 1, wherein the liner is manufactured by a film extrusion or extrusion blow molding or bi-extrusion or multi-extrusion.

10. The tank of claim 1, wherein the liner is manufactured by aqueous coating or solvent on an anti-adhesive substrate.

11. The tank of claim 1, wherein the liner is manufactured using an application method for polymer paints in an aqueous or solvent route, selected from spraying, application by brush or roller.

12. The tank of claim 1, wherein the reinforcing textile layer includes several thicknesses of textile reinforcements.

13. The tank of claim 1, wherein the liner is bonded to the textile reinforcement by hot gluing, cold gluing, co-vulcanization or welding.

14. A flexible fuel tank, comprising:

a single-layer or multilayer liner having properties of sealing with respect to a fuel, impermeability to vapor of the fuel, and dissipation of electrostatic charges, the liner having an inner face in contact with the fuel and an outer face opposite the inner face, the liner formed of a matrix having at least one polymer and including conducting fillers integrated into the matrix at a rate of 0.5 to 100 parts conducting filler per 100 parts polymer, the conducting fillers including at least one of standard reinforcing carbon black, conducting carbon black, single-, double- or multi-walled carbon nanotubes, graphite, intrinsic conducting polymers or metal fillers to ensure the presence of an internal percolation network;

an intermediate layer in contact with the outer face of the liner; and a textile reinforcing layer in contact with the intermediate layer.

15. The fuel tank of claim 14, wherein the fillers are of the carbon black type, the specific surface of which per BET according to standard ASTM D3037 is comprised between 12 and 2000 m$^2$/g.

16. The fuel tank of claim 14, wherein the outer face of the liner has an impermeability with respect to the fuel vapors below 6 g/m$^2$/24 h.

17. The fuel tank of claim 14, wherein the inner face of the liner has a surface resistivity lower than $10^8$ ohm/square.

18. The fuel tank of claim 14, wherein the liner comprises at least:

a first outer layer having, as a main component in its matrix, at least one polymer from a group of polyamides including Pa 6, Pa 6.6, Pa 11, Pa 12, Pa 6.12, Pa 4.6, co-polyamides, aromatic polyamides, polyimides, polyphenol sulfites, fluorinated polymers, polyether ketones; and a second inner layer having the properties of dissipating electrostatic charges and having, as primary component in its matrix, at least one polymer from a group of polyamides, co-polyamides, aromatic polyamides, polyimides, polyphenol sulfides, fluorinated polymers, polyether ketones, polyurethane, nitrile and its derivatives, epichlorhydrin and its derivatives, fluoropolymer and its derivatives, polychloroprene or fluorosilicone.

19. A flexible fuel tank comprising:

a single-layer or multilayer liner having properties of sealing with respect to the liquid, impermeability to the vapor of said fuel, and dissipation of electrostatic charges, said liner including an inner face intended to be in contact with the fuel and an outer face, the liner having a total thickness between the inner face and the outer face of less than 150 microns;

an intermediate layer in contact with the outer face of the liner; and a textile reinforcing layer in contact with the intermediate layer.

* * * * *